(12) United States Patent
Lung et al.

(10) Patent No.: US 7,771,107 B2
(45) Date of Patent: Aug. 10, 2010

(54) BACKLIGHT MODULE STRUCTURE AND BACKLIGHT MODULE INCORPORATING SAME

(75) Inventors: Sheng Chieh Lung, Hsinchu (TW); Ming Chin Wen, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 109 days.

(21) Appl. No.: 12/017,197

(22) Filed: Jan. 21, 2008

(65) Prior Publication Data

US 2009/0016053 A1      Jan. 15, 2009

(30) Foreign Application Priority Data

Jul. 11, 2007    (TW) ............................ 96125206 A

(51) Int. Cl.
*F21V 21/088* (2006.01)
(52) U.S. Cl. ..................... 362/634; 362/632; 362/633; 362/225; 362/97.1
(58) Field of Classification Search ....... 362/97.1–97.4, 362/225, 632–634, 612, 613, 249.02, 249.09; 349/61, 69, 58, 65
See application file for complete search history.

(56) References Cited

U.S. PATENT DOCUMENTS

| 7,086,775 | B2 | 8/2006 | Huang et al. | |
| 7,578,610 | B2 * | 8/2009 | Sakamoto et al. | 362/634 |
| 2005/0243576 | A1 | 11/2005 | Park et al. | |
| 2006/0066767 | A1 | 3/2006 | Kao et al. | |
| 2006/0083019 | A1 | 4/2006 | Hahm et al. | |
| 2006/0087866 | A1 | 4/2006 | Ng et al. | |
| 2006/0187660 | A1 * | 8/2006 | Liu | 362/294 |
| 2007/0165425 | A1 * | 7/2007 | Sakamoto et al. | 362/633 |

FOREIGN PATENT DOCUMENTS

| CN | 1588204 | 3/2005 |
| TW | 200611027 | 4/2004 |
| TW | I247951 | 12/2004 |
| TW | I226494 | 1/2005 |
| TW | I239108 | 9/2005 |
| TW | M298140 | 9/2006 |

OTHER PUBLICATIONS

English language translation of abstract of TW I247951.
English language translation of abstract of TW I239108.
English language translation of abstract of TW M298140.
English language translation of abstract of CN1588204.

* cited by examiner

*Primary Examiner*—Jong-Suk (James) Lee
*Assistant Examiner*—Robert J May
(74) *Attorney, Agent, or Firm*—Thomas, Kayden, Horstemeyer & Risley

(57) ABSTRACT

A backlight module structure and a backlight module incorporating the structure are provided. The backlight module includes a back plate and at least one light source device. The back plate includes a base and a plurality of projections which are substantially parallel to each other. The projections are disposed on the base and spaced apart from each other to define at least one slot and be placed at a specific height (the first height) relative to the base. The light source device is adapted to fit into the slot. The light source device includes a substrate and a plurality of light sources which are disposed on the substrate and are placed at another specific height (the second height) relative to the base. The first height is substantially equal to or higher than the second height.

9 Claims, 4 Drawing Sheets

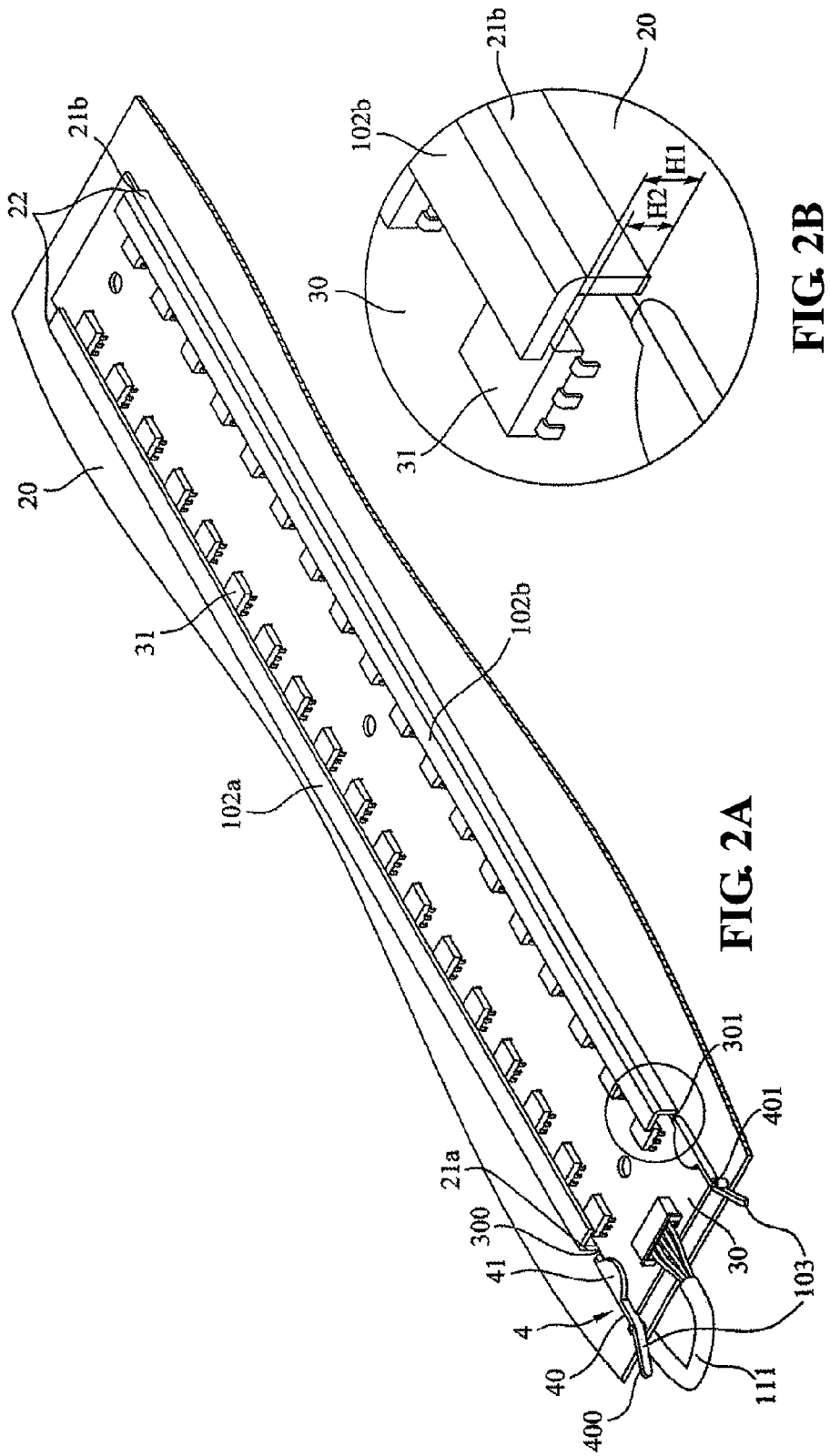

ated LCD assembly structure.

BACKLIGHT MODULE STRUCTURE AND BACKLIGHT MODULE INCORPORATING SAME

CROSS-REFERENCES TO RELATED APPLICATIONS

This application claims the benefit of priority based on Taiwan Patent Application No. 096125206, filed Jul. 11, 2007, the contents of which are incorporated herein by reference in its entirety.

BACKGROUND OF THE INVENTION

1. Field of the Invention

The present invention relates to a backlight module structure and a backlight module incorporating the structure. More particularly, the present invention relates to both a backlight module structure for fixing a light source device of a liquid crystal display (LCD) and a backlight module incorporating the structure.

2. Descriptions of the Related Art

The liquid crystal display (LCD), a full color display device using liquid crystal technology, has many advantages, such as low power consumption, low emission, small volume, variable sizes, and a light weight. Therefore, LCDs have been in widespread use in products incorporating display screens, such as digital cameras, personal digital assistants (PDAs) and TV sets. LCDs differ from conventional cathode ray tube (CRT) displays in that the liquid crystal layers of the LCDs do not emit light themselves. Thus, to obtain an image on the screen, an additional light source is required. Generally, the additional light source is known as a backlight module.

An LCD generally comprises a backlight module, an optical membrane module, an LC panel, and a color filter module stacked in sequence. The backlight module comprises a plurality of light source devices to provide a light source. For example, in an LCD using a number of point light source elements, each of the light source devices further comprises a plurality of light source elements such as light emitting diodes (LEDs). After operating for a period of time, some of the light source devices or light source elements therein may fail to work and lead to a degraded image displaying quality of the LCD. At this point, the light source devices have to be taken out for repair.

However, during the repair of a conventional LCD assembly structure, the optical membrane module, the LC panel, and the color filter module have to be removed simultaneously and then replaced upon completion of the repair. This removal process is inconvenient and labor consuming. Additionally, in the conventional LCD assembly structure, the light source devices are fixed to a back plate of the backlight module with a locking latch, which renders the processes of assembling and maintaining the backlight module more complicated and time-consuming. Furthermore, misalignment tends to occur when aligning a light source device with the locking latch, which further increases the time needed for maintenance, as well as the costs.

In summary, the design of the conventional LCD assembly structure makes it difficult to repair and assemble, thus, lengthening work time and increasing costs. Therefore, efforts still have to be made to facilitate the assembly and removal process of the backlight module and the light source devices thereof in an LCD without modifying the conventional LCD assembly structure.

SUMMARY OF THE INVENTION

One objective of this invention is to provide a backlight module and a structure thereof adapted for an LCD, which may facilitate the assembly and removal processes of the backlight module without modifying the conventional LCD assembly structure.

A backlight module disclosed in this invention comprising a power supply device and a backlight module structure is provided. The power supply device is adapted to supply power to the backlight module structure. The backlight module structure comprises a back plate and at least one light source device. The back plate has a base and a plurality of projections substantially parallel to each other, wherein the projections are disposed on the base and spaced apart from each other to define at least one slot, and have a first height relative to the base. The at least one light source device comprises a substrate and a plurality of light sources, wherein the plurality of light sources are disposed on the substrate and have a second height relative to the base. The first height is substantially equal to or higher than the second height, so that the at least one light source is adapted to be received in the at least one slot.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2A is a partial perspective diagram of the backlight module, according to the present invention;

FIG. 2B is an enlarged partial diagram of FIG. 2A;

DESCRIPTION OF THE PREFERRED EMBODIMENT

Figure 1:
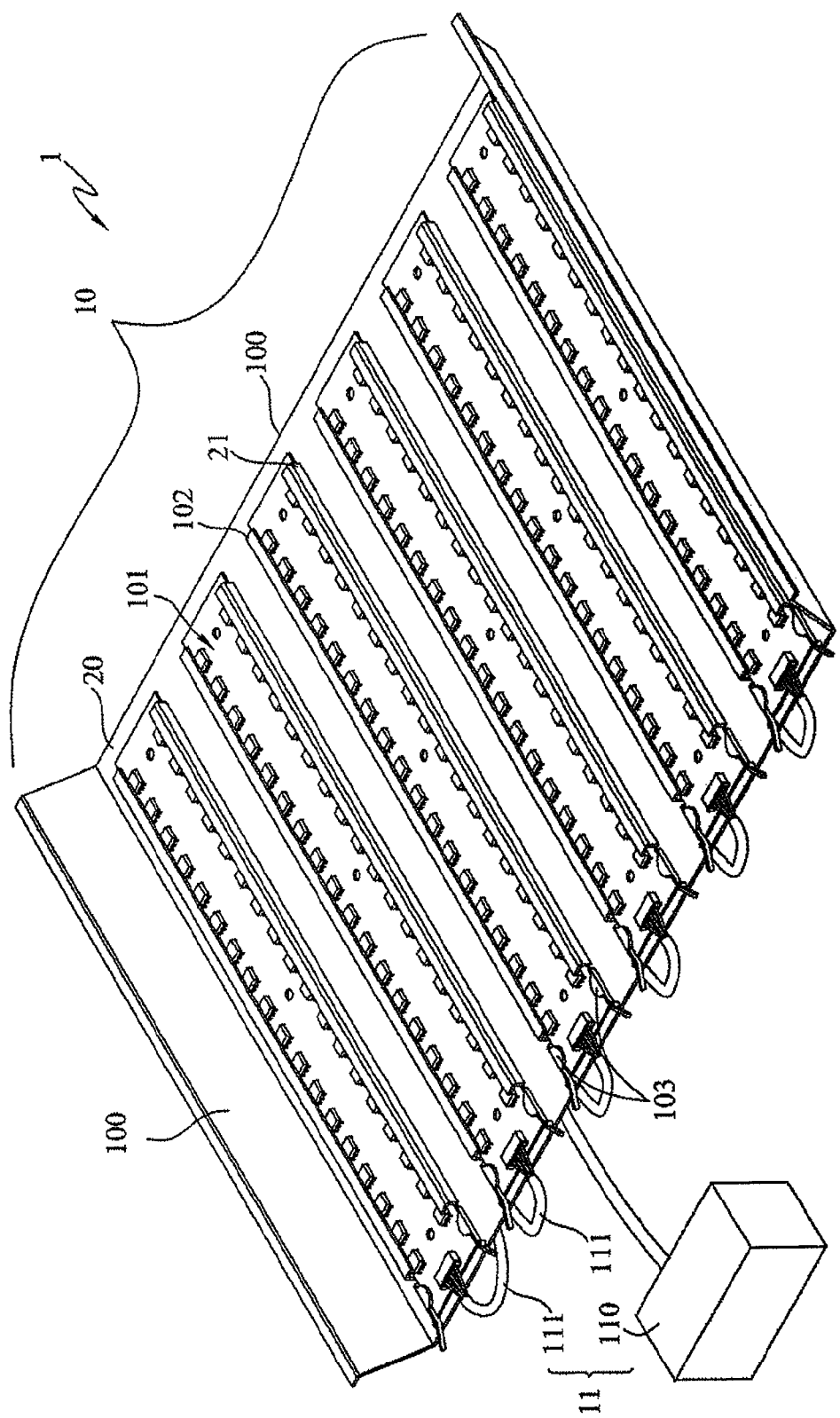
FIG. 1 is a perspective diagram of a backlight module, according to the present invention.

FIG. 1 is a schematic perspective diagram of a preferred embodiment of a backlight module, according to the present invention. The backlight module 1 primarily comprises a backlight module structure 10 and a power supply device 11. The power supply device 11 comprises a power supply 110 and a plurality of power lines 111, while the backlight module structure 10 comprises a back plate 100, a plurality of light source devices 101, a plurality of stoppers 102, and a plurality of positioning devices 103. Power supplied from the power supply 110 is transmitted through the power lines 111 to the light source devices 101.

The back plate 100 comprises a base 20 and a plurality of projections 21 substantially parallel to each other. The back plate 100 is a one-piece bent structure formed of a single plate, the projections 21, and the base 20.

For simplicity, FIG. 2A illustrates only a portion of the backlight module structure. Two adjacent protrusions 21a, 21b are disposed on the base 20 and spaced apart from each other to define a slot 22. A stopper 102a and a stopper 102b extend from the top surfaces of the protrusions 21a, 21b respectively towards the slot 22 corresponding to the respective protrusions 21a, 21b, thus making a better defined slot 22. In other words, in this embodiment, the stoppers 102a, 102b are perpendicularly connected with the respective protrusions 21a, 21b and parallel to the base 20.

The light source device 101 comprises a substrate 30 and a plurality of light sources 31 disposed on the substrate 30. In this preferred embodiment, the substrate 30 has two opposite sides 300, 301, with the light sources 31 located therebetween. The two opposite side 300, 301 are adapted to be inserted under the stoppers 102a, 102b, so that the substrate 20 can fit in the slot 22 along an underside of respective stoppers 102a, 102b to avoid misalignment of the substrate 30. In this preferred embodiment, the substrate 30 is a printed circuit board electrically connected to the light sources 31, while the light sources 31 are a plurality of LEDs. The power supply of the power supply device supplies power to the substrate 30 of the backlight module structure 10 through the power lines 111 to light up the light sources 31. The above example is only intended to facilitate the description of the preferred embodiment of this invention, rather than to limit the scope of this invention.

FIG. 2B is an enlarged partial diagram of FIG. 2A. The protrusions 21a, 21b have a first height H1 relative to the base 20, while the light sources 31 have a second height H2 relative to the base 20. The first height H1 is substantially larger than the second height H2, so that the substrate 30 is adapted to be guided and received within the slot 22 along an underside of respective stoppers 102a, 102b. In other implementations, the first height H1 may be just equal to the second height H2, so that the substrate 30 is inserted into the slot exactly. Therefore, it can be known that the protrusions 21 and the base 20 of the structure shown in FIG. 1 to define a plurality of slots 22 used for contains the corresponding light source devices 101.

A positioning notch 302 is formed at an end portion of the substrate 30, while a positioning device 103 is formed on at least one end of the back plate 100 to cooperate with the positioning notch 302 to position the substrate 30 of the light source device 101 onto the back plate 100.

The positioning device 103 comprises a plurality of positioning elements, e.g., the positioning elements 4 shown in FIG. 2A. Each of the positioning elements 4 has an elastic portion 40 and a positioning portion 41. The elastic portion 40 has two opposite ends, one of which is an operation end 400. The back plate 100 is connected with the positioning element 4 through a fixing element 401 (e.g., a latch) located between the two opposite ends. In more detail, the base 20 of the back plate 100 is connected to the positioning element 4 through the fixing element 401 located in the middle between the two opposite ends.

Figure 2C:
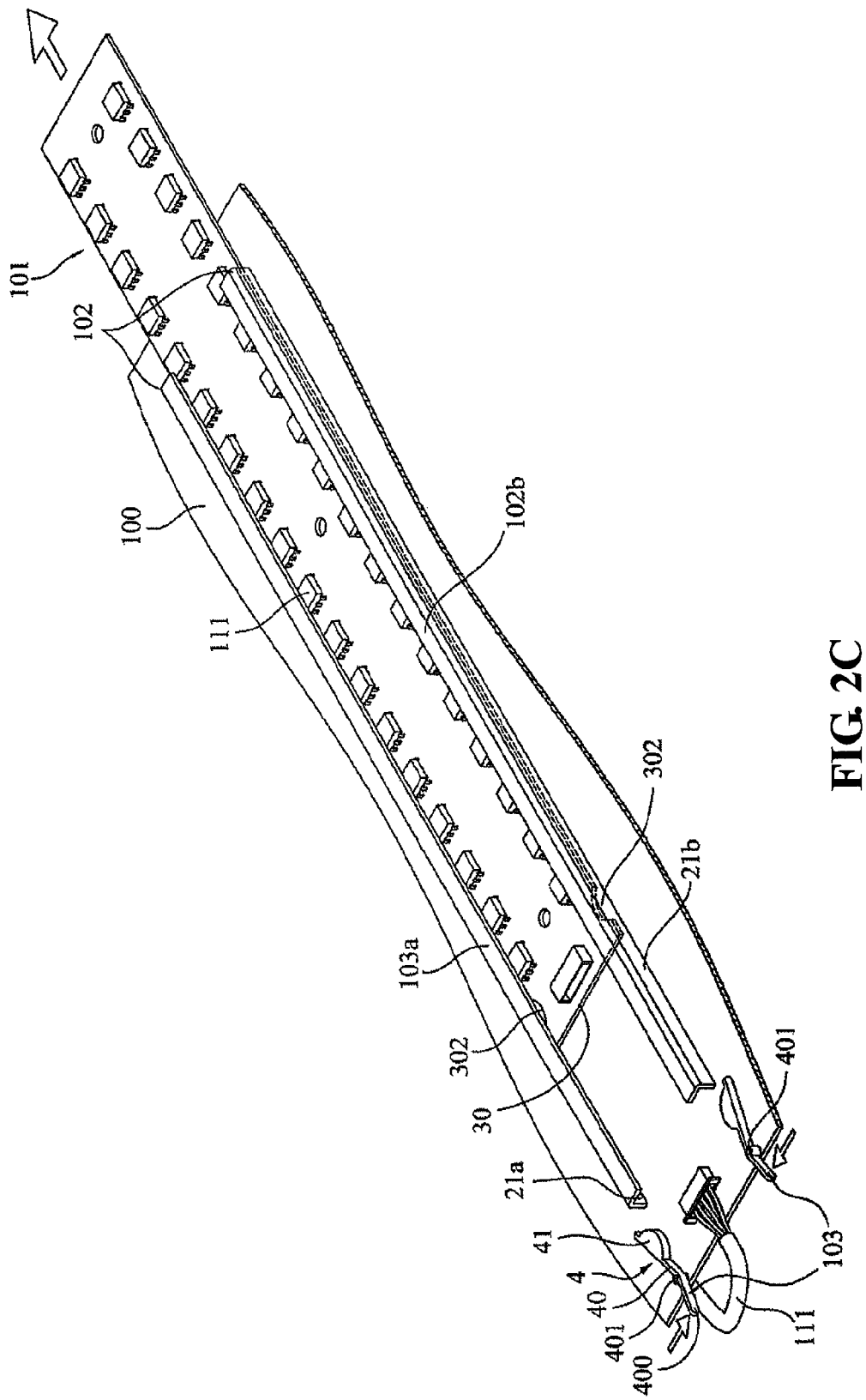
FIG. 2C is a perspective diagram illustrating the positioning process of a light source device shown in FIG. 2A.

The positioning portion 41 extends into the substrate 30 from the other end of the elastic portion 40 opposite to the operation end 400. As shown in FIG. 2A, when the light source device 101 is located in the corresponding slot 22, the positioning portion 41 is adapted to be received in the positioning notch 302, and is provided with an inward thrust by the elastic portion 40 to position the light source device 101 in the slot 22. On the other hand, when the light source device 101 is pulled out from the slot 22, an inward operational force is applied to the operation end 400 to separate the positioning portion 41 from the positioning notch 302 to relieve the position, as shown in FIG. 2C. The shapes, locations, or sizes of the positioning notches, positioning devices, and fixing elements are not just limited to those described in the above embodiment, and other positioning manners may readily occur to those skilled in the art.

Figure 3:
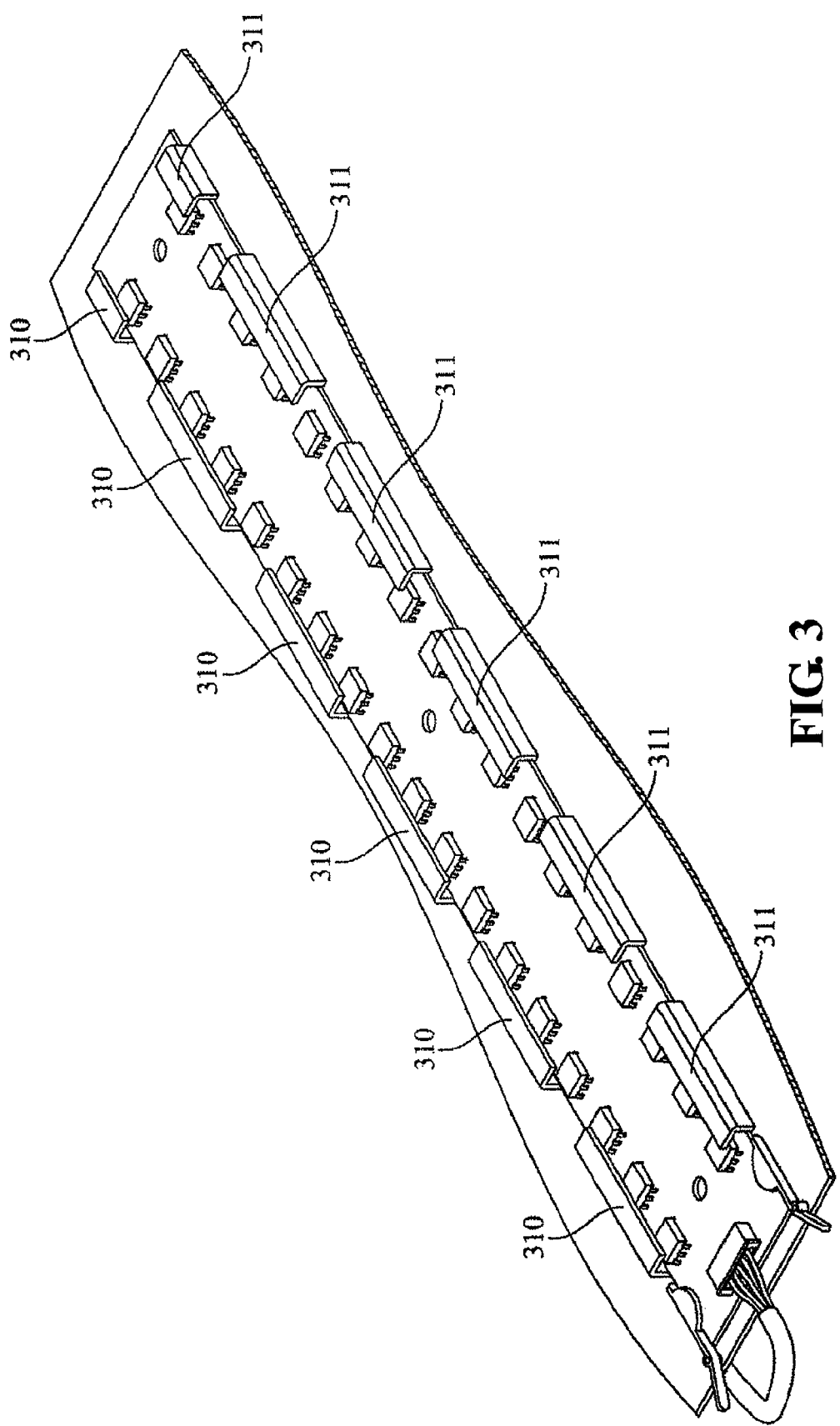
FIG. 3 is a perspective diagram of another preferred embodiment of the present invention.

The configuration of the stoppers disclosed herein is only for convenience of describing this embodiment, and not to limit the scope of this invention. A variety of alterations to the stoppers of this invention may readily occur to those of ordinary skill in the art. For example, in another preferred embodiment as shown in FIG. 3, the stoppers 102a, 102b disposed respectively on the two protrusions 21a, 21b in the above embodiment are replaced by a plurality of first side stoppers 310 and a plurality of second side stoppers 311 respectively to prevent the substrate 30 from offsetting.

By using the backlight module and the structure thereof disclosed in this invention, the LCD assembly structure remains unmodified, while the light source devices can be pulled out of the backlight module and replaced without the need to remove the optical membrane module, LC panel, and color filter module. This may increase the efficiency of assembling and maintaining the backlight module, thereby reducing production costs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backlight module structure, comprising:
    a back plate including a base and a plurality of projections substantially parallel to each other, the projections being disposed on the base and spaced apart from each another to define at least one slot, in which the projections have a first height relative to the base;
    at least one light source device adapted to be received in the at least one slot, the at least one light source device including a substrate and a plurality of light sources disposed on the substrate, wherein the light source device has a second height relative to the base, the first height is being substantially equal to or greater than the second height, the substrate of the at least one light source device having an end portion; and
    a positioning device comprising a plurality of elastic positioning elements, wherein the positioning device is disposed on at least one end of the back plate, the positioning device elastically engaging the end portion of the substrate positioning the substrate of the at least one light source device on the back plate, wherein the substrate is removable from the back plate by separating each of the positioning elements from the substrate.

2. The backlight module structure of claim 1, wherein the at least one light source device comprises a plurality of light source devices, and the projections define a plurality of slots for receiving the respective light source devices.

3. The backlight module structure of claim 2, further comprising a plurality of stoppers, each extending from a top surface of each of the projections toward the slot.

4. The backlight module structure of claim 3, wherein the substrate of each of the light source devices has two opposite sides to receive the light sources therebetween, and the two opposite sides are formed under the corresponding stopper to guide the substrate in the slot along an underside of the corresponding stopper.

5. The backlight module structure of claim 2, wherein the end portion of each substrates is formed with a positioning notch, and each of the elastic positioning elements comprises:

an elastic portion having two opposite ends with one of which is an operation end, and the back plate being connected with the positioning element between the opposite ends; and a positioning portion extending inwardly from the other of the end of the elastic portion, the positioning portion being adapted to be received in the positioning notch and provided with an inward thrust from the elastic portion to position each of the light source devices in the positioning notch when each of the light source devices is located in the corresponding slot, and an operation force being brought to the operation end to separate the positioning portion from the positioning notch to relieve the position when each of light source devices is required to be pulled out from the slot.

6. The backlight module structure of claim 1, wherein the back plate is a one-piece bent structure formed of a single plate, the projections, and the base.

7. The backlight module structure of claim 1, wherein the substrate of the at least one light source device is a printed circuit board and electrically connected to the light sources.

8. The backlight module structure of claim 1, wherein each of the light sources is a light emitting diode.

9. A backlight module, comprising:

a backlight module structure of claim 1; and a power supply being electrically connected to the at least one light source device so as to power the light sources.

* * * * *